Sept. 2, 1958          E. H. REESER          2,849,890
REMOTE CONTROL PEDAL OPERATING DEVICE
Filed June 13, 1955          2 Sheets—Sheet 2
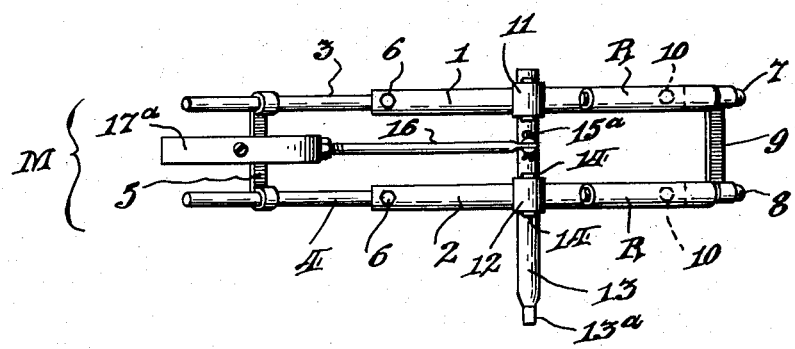
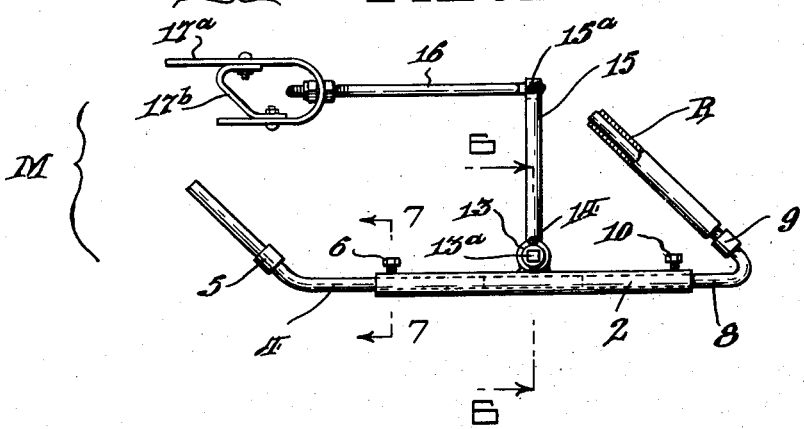
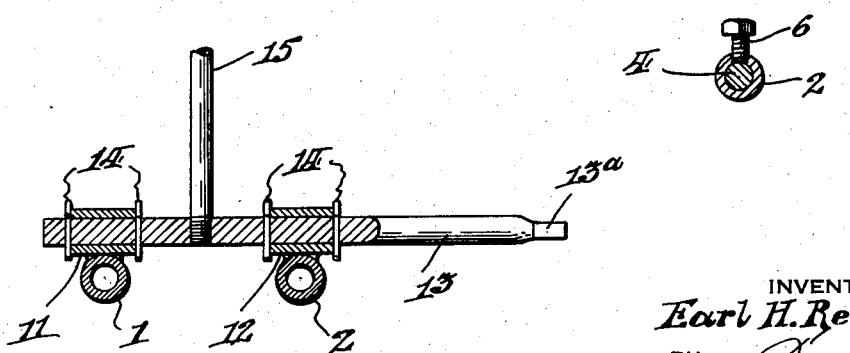
INVENTOR:
Earl H. Reeser,
BY
Alfred E. Ischinger
ATTORNEY.

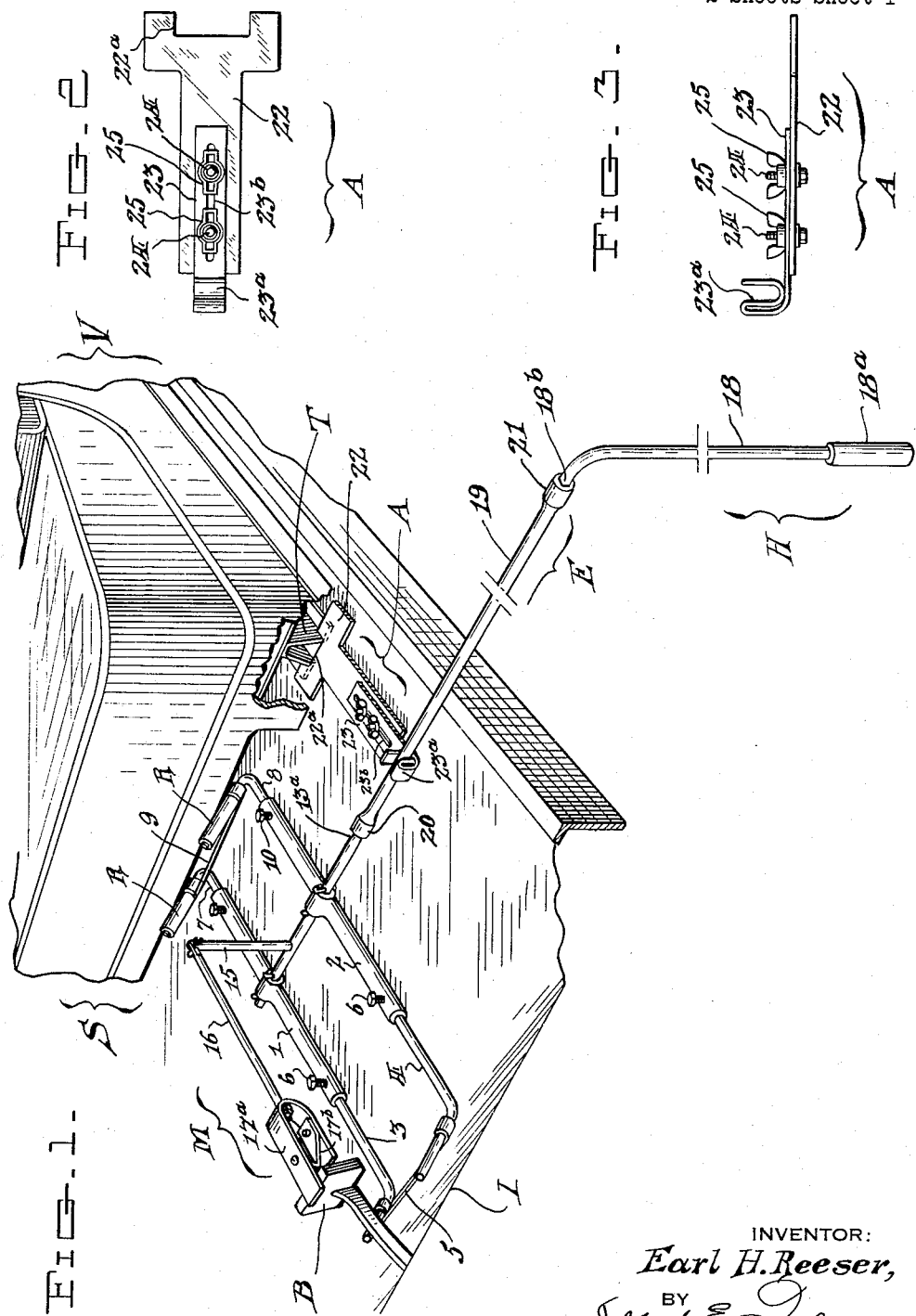

United States Patent Office 2,849,890
Patented Sept. 2, 1958

2,849,890

REMOTE CONTROL PEDAL OPERATING DEVICE

Earl H. Reeser, Bernville, Pa.

Application June 13, 1955, Serial No. 515,165

9 Claims. (Cl. 74—481)

This invention relates, in general, to remote control pedal operating appliances or devices for automotive vehicles, and more particularly concerns a device of this type which is adapted to readily enable a mechanic to reciprocate the brake pedal of an automotive vehicle so as to effect bleeding of air from the hydraulic brakes thereof, while the mechanic is at work at a vehicle location where the brake pedal is normally beyond his reach.

One object of my invention is to provide a novel remote control pedal operating appliance or device of the type indicated.

Another object is to provide such a device which has certain structural and functional features of advantage over the similar devices of the prior art.

A further object is to provide such a device which can be quickly and easily installed in, and removed from, an automotive vehicle, so as to minimize the time required for the installation and removal procedure thereof.

Another object is to provide such a device which is simple in construction, consists of few and rugged parts, can be economically manufactured and serves its intended purpose in a practical, efficient and effective manner.

An additional object is to provide such a device which is adapted to be conveniently mounted on the floor of the vehicle, between the front seat thereof and the frontal upwardly inclined floor portion thereof at which the brake pedal is located.

It is also an object to provide such a device which can be mounted and anchored in place for use without requiring the attachment of any of its component parts to a vehicle element.

Another object is to provide such a device which can be mounted in, and removed from, an automotive vehicle, without danger of damaging or marring of any of the vehicle parts.

Another feature resides in the provision of such a device having an operating handle, or operating element arrangement, which enables convenient actuation of the device by hand or by foot, at various locations about the vehicle where a mechanic is stationed during the performance of his work.

Another object is to provide such a device which comprises a plurality of separate units that can be quickly and easily combined, or assembled for use, by interfitting connecting means.

A further object is to provide such a device which can be readily adjusted for proper accommodation at its mounting location and to effect compensation for any variance in the dimensional characteristics at such location in different automotive vehicles.

With these and other objects in view, which will become more readily apparent from the following detailed description of one practical and illustrative embodiment of my improvements, as shown in the accompanying drawings, the invention comprises the novel device, elements, features of construction and arrangement of parts in cooperative relationship, as more particularly indicated and defined by the hereto appended claims.

In the drawings:

Figure 1 is a perspective view of one form of my device, as it appears when mounted in an automotive vehicle for use to operate the brake pedal of the latter.

Fig. 2 is a top plan view of one of the auxiliary units of my device, which forms part of my invention.

Fig. 3 is a side elevational view of the unit shown in Fig. 2.

Fig. 4 is a top plan view of the main unit of the device of my invention.

Fig. 5 is a side elevational view of the unit shown in Fig. 4.

Fig. 6 is a detail elevational sectional view, taken substantially as indicated by the arrows 6—6 on Fig. 5, and Fig. 7 is a detail cross-sectional view, taken as indicated by the arrows 7—7 on Fig. 5.

Referring to the drawings, wherein like reference characters are used to designate corresponding parts, it will be seen that the novel appliance, or device, of my invention, is adapted to be mounted for use in an automotive vehicle, substantially as indicated in Fig. 1, in which the automotive vehicle is generally identified by the letter V. It is to be understood that the term "automotive vehicle" includes automotive conveyances in general, such as automobiles, trucks, taxis, buses, etc., in which my device can be mounted and associated with the vehicle parts, in a manner substantially as hereinafter explained.

The practical and illustrative form of my device shown, generally comprises a main unit M, a separate auxiliary unit A, a handle member H and an intermediate connecting element E.

The main unit M generally comprises two similar tubular metallic members 1 and 2, that are arranged in parallelism and the front portions of which have interfittingly inserted therein the rear end sections of two similar parallel extending metallic rods 3 and 4 that are rigidly held together by a metallic strap-like element 5, each end of which is turned in tightly holding relation about one of the rods 3 and 4. The forward sections of the rods 3 and 4 are angularly bent upwardly in relation to the rearward, or horizontally extending, sections of said rods. Since the rods 3 and 4 are combinedly held together by the element 5, the parts 3, 4 and 5 can be slidingly moved in unison in the front sections of the tubular members 1 and 2 for lengthwise adjustment. To hold the rigidly combined parts 3, 4 and 5 in a selectively adjusted position in relation to the tubular members 1 and 2, a pair of similar locking bolts, or elements 6, are arranged to extend in threaded relation through a front top wall portion of each of the tubular members 1 and 2, for locking engagement with the rods 3 and 4, as clearly shown in Fig. 7.

The rear portions of the tubular members 1 and 2 have similarly slidingly engaged therein a rigidly combined arrangement comprising two metallic rods 7 and 8 and a metallic strap-like member 9. The rods 7 and 8 also include horizontally extending sections that are adapted to be slidingly engaged in interfitting relation with the rear portions of the tubular members 1 and 2, and sections that extend upwardly at an acute angle with respect to said horizontally extending sections. Each of the upwardly extending sections of the rods 7 and 8 has mounted thereon a similar sleeve R made of soft, or yieldable material, such as soft rubber, textile material, etc. To hold the rigidly combined parts 7, 8 and 9 in a selectively adjusted position relative to the tubular members 1 and 2, a pair of similar locking bolts, or elements 10, are arranged to extend in threaded relation through a rear top wall portion of each of the tubular members 1 and 2.

It will be noted that the rigidly combined parts 3, 4 and 5 form an adjustable frame-like arrangement at the front of the unit M and that the rigidly combined parts 7, 8 and 9 similarly form an adjustable frame-like arrangement at the rear of said unit M.

Intermediate of the ends of the tubular members 1 and 2, are two bearings 11 and 12, that are rigidly secured to the tubular members 1 and 2 by soldering, or in some other practical manner. The said bearings 11 and 12 are arranged in axial alignment with each other and have extending therethrough, for free turning movement therein, a shaft 13, one end of which is provided with a shaft connecting element 13a, indicated in the form of an integral square-shaped portion adapted to slidingly fit into a complementary socket connecting element. To hold the shaft 13 in position against axial movement in the bearings 11 and 12, cotter pins 14 are arranged to extend through suitable apertures provided in the shaft 13, at each end of the bearings, as clearly shown in Fig. 6.

A metallic rod 15 extends upwardly from the shaft 13, which rod is rigidly connected with the latter, as by threaded engagement of its lower end in a correspondingly threaded bore in the shaft 13, as clearly shown in Fig. 6. The upper end of the shaft 15 is bifurcated and mounted between the bifurcations is the reduced flat rear end portion of a metallic rod 16, that is pivotally held in place between said bifurcations by a cotter pin 15a. The forward end of the rod 16 is threaded and has bolted thereto a pedal engaging unit 17, which is made of two flat metallic pieces 17a and 17b, that are shaped substantially as shown and bolted together as indicated. It will be noted that the upper leg of the piece 17a is somewhat longer than the lower leg thereof and that the piece 17b has a central portion arranged at an inclination. This provides the front end of the pedal engaging unit 17 with a configuration which can be readily seatingly engaged with, or on, the brake pedal B of the vehicle V, as clearly indicated in Fig. 1.

The handle member H, in the present instance is in the form of a rigid right-angular bar 18, formed of metal or some other suitable material, having a handle 18a at one end thereof and a connecting element 18b at the other end, such as an integrally formed square-shaped portion adapted to fit into a complementary connecting socket.

The intermediate connecting element E is in the form of a rigid bar 19, formed of metal or some other suitable material, having connecting means at each end thereof, such as integrally formed sockets 20 and 21, adapted to form complementary separable connecting parts for the parts 13a and 18b respectively. It is to be understood that the connecting arrangement between the shaft 13, connecting element E and handle member H, can be varied and otherwise carried out in any desired manner in accordance with the usual and well known prior art practice of establishing a fixed, pivotal, or separable connection between such parts. Furthermore, that the connecting element E and the handle member H, can be made of any desired length, or shape, or that separate extension pieces may be added, so that the handle 18a will be located to best advantage at the remote control position found most desirable by a mechanic in effecting operation of the brake pedal during the performance of his work about the vehicle V.

The separate auxiliary unit A is provided to steady and maintain the connecting element E in axial alignment with the shaft 13 and to prevent lateral shifting of the element E when the handle 18a is being manipulated. To this end, the unit A comprises a flat metallic base plate 22 on which is mounted a flat metallic piece 23, the forward end of which is shaped as shown to form a bearing part 23a for the connecting element E, which bearing part is open at its top, so that the element E can be readily inserted therein and withdrawn therefrom, as desired. At its rear end, the base plate 22 is notched, or cut out, as indicated at 22a, so that the base plate can be positioned in interfitting relation against the seat track element T of the vehicle V, as indicated in Fig. 1. The piece 23 is provided with a longitudinally extending slot 23b through which are adapted to extend a pair of similar bolts 24, having threadedly connected therewith a pair of similar wing nuts 25. The bolts 24 extend through circular apertures in the plate 22. By means of the arrangement just described, the piece 23 can be selectively longituinally adjusted relative to the base plate 22, so that when the unit A has been anchoringly set against the seat track element T, the bearing parts 23a can be properly positioned in relation to the connecting element E, as shown in Fig. 1.

By reference to Fig. 1, it will be apparent how my remote control pedal operating device is mounted for use in an automotive vehicle V. The procedural steps in mounting the device are substantially as follows:

The main unit M is placed on the floor of the vehicle V so as to extend lengthwise between the front seat structure thereof, which is generally indicated by the letter S, and the front upwardly inclined floor portion thereof, generally indicated by the letter I. The brake pedal engaging unit 17 is arranged so that the part 17a thereof rests on the upper edge of the brake pedal B, in the manner substantially as shown. The forward frame-like arrangement comprising the rigidly combined parts 3, 4 and 5, are adjustably positioned so that the forward inclined portions of the rods 3 and 4 rest in parallel arrangement on, or against, the upwardly inclined floor portion I, and said forward frame-like arrangement is then locked together with the tubular members 1 and 2 by means of the locking bolts 6.

The rear frame-like arrangement, comprising the rigidly connected parts 7, 8 and 9, is adjustably positioned so that the forwardly inclined portions of the rods 7 and 8 thereof have their rubber sleeves R in contacting or pressing relation against the edge of the cut-out portion of the seat structure S, substantially as shown. The said rear frame-like arrangement is then locked together with the tubular members 1 and 2 by means of the locking bolts 10.

The auxiliary unit A is then placed on the floor of the vehicle, as shown in Fig. 1, so that the cut-out section 22a at the rear end of the base plate 22 fits about the seat track member T.

The connecting element E is then placed in the bearing portion 23a of the unit A, in axial alignment with the shaft 13, and joined with the latter by the complementary separable connecting means 13a and 20.

Finally, the handle member H is joined with the forward end of the connecting element E, which extends beyond the floor of the vehicle V, through the opened door of the latter, by the complementary separable connecting means 21 and 18b.

It will be understood that the handle member H can be so connected with the element E in such manner that it will extend downwardly, as shown, or connected so that it will extend at an angle along the side of the vehicle, toward the front, or the rear, for most convenient manipulation by a mechanic, either by hand, or with his foot, in order to facilitate actuation of the device and reciprocation of the brake pedal B, in connection with an air bleeding operation of the hydraulic brakes of the vehicle, or for any other purpose. Movement of the handle 18a in a direction towards the rear of the vehicle V will cause the brake pedal B to be moved forward by the device and since the reverse movement of the brake pedal is effected, as usual, by the action of a brake pedal operating spring (not shown) the handle 18a will return to its initial position as soon as it is released, or permitted to so move by the action of said spring.

From the foregoing it will be realized that the device of my invention comprises separate units, or elements, which can be quickly and easily assembled and properly installed in an automotive vehicle, or removed therefrom, without injuring or marring any of the vehicle parts. Also, that such installation and removal of the device can be effected without securing or attaching any of the device elements to a vehicle part.

Of course, the improvements specifically shown and described can be changed and modified in various ways apparent to those skilled in this art, and without departing from the invention herein disclosed and more particularly defined by the hereto appended claims.

I claim:

1. A remote control pedal operating device of the character described comprising; a portable frame unit having adjustable front and rear extension members and adapted to be seated in unattached manner on the floor of an automotive vehicle in rearwardly extending alignment relation with a vehicle pedal, with the rear end of said unit in contact with the front seat structure and the front end of said unit lying along the forward upwardly inclined floor portion; a freely turnable shaft mounted in transversely extending relation centrally of said frame unit; shaft actuating means provided with a manipulating element that is located outside of the vehicle body; and pedal operating means connected with said shaft.

2. A device in accordance with claim 1, including a separate bearing unit for said shaft actuating means arranged in contacting relation with a portion of said seat structure.

3. A device in accordance with claim 1, including a separate bearing unit for said shaft actuating means arranged to maintain the latter in axially aligned relation with said shaft.

4. A device in accordance with claim 1, wherein said pedal operating means includes an element adapted to rest on a top edge section of the pedal.

5. A device in accordance with claim 1, wherein said pedal operating means includes a pair of pivotally connected rod-like elements.

6. A device in accordance with claim 1, wherein connecting means is arranged between said manipulating element and said freely turnable shaft in the form of a rigid extension rod.

7. A device in accordance with claim 1, wherein said freely rotatable shaft is provided with an end portion having means for effecting a separable connection with an extension rod arranged between said manipulating element and freely rotatable shaft.

8. A device in accordance with claim 1, wherein the said manipulating element includes a handle at one end and at its other end with means for establishing a separable connection with an extension rod arranged between said manipulating element and freely rotatable shaft.

9. A remote control pedal operating device of the character described comprising a main frame unit which is adapted to be seated on the floor of an automotive vehicle in unattached manner and includes two tubular members arranged in spaced parallel relation, a separate auxiliary frame-like member adapted to engage the forward upwardly inclined vehicle floor portion and having a pair of rod-like elements slidingly engaged in the forward portions of said tubular members, a separate auxiliary frame-like front seat engaging member having a pair of rod-like elements slidingly engaged in the rearward portions of said tubular members, means for maintaining said auxiliary frame-like members in selectively adjusted relation with said tubular members, a pair of axially aligned bearing members fixedly mounted on said tubular members intermediate the ends thereof, a shaft arranged to extend through both of said bearings for free rotary movement therein, means for maintaining said shaft and bearing members in fixed positional relation with each other, an upwardly extending rod the lower end of which is fixedly connected with said shaft, a horizontally extending rod the rear end of which is pivotally connected with the upwardly extending rod, and a pedal engaging element on the forward end of said horizontally extending rod.

References Cited in the file of this patent

UNITED STATES PATENTS

| 2,202,585 | Jordan | May 28, 1940 |
| 2,597,379 | Romel | May 20, 1952 |
| 2,599,376 | Ehrenberg | June 3, 1952 |
| 2,674,901 | Boge | Apr. 13, 1954 |
| 2,694,946 | Vandal | Nov. 23, 1954 |
| 2,696,890 | Mulkay | Dec. 14, 1954 |
| 2,710,547 | Davenport | June 14, 1955 |

FOREIGN PATENTS

| 659,334 | Great Britain | Oct. 24, 1951 |